(No Model.)
H. H. BAKER.
SPOKE FASTENING.
No. 496,844. Patented May 9, 1893.
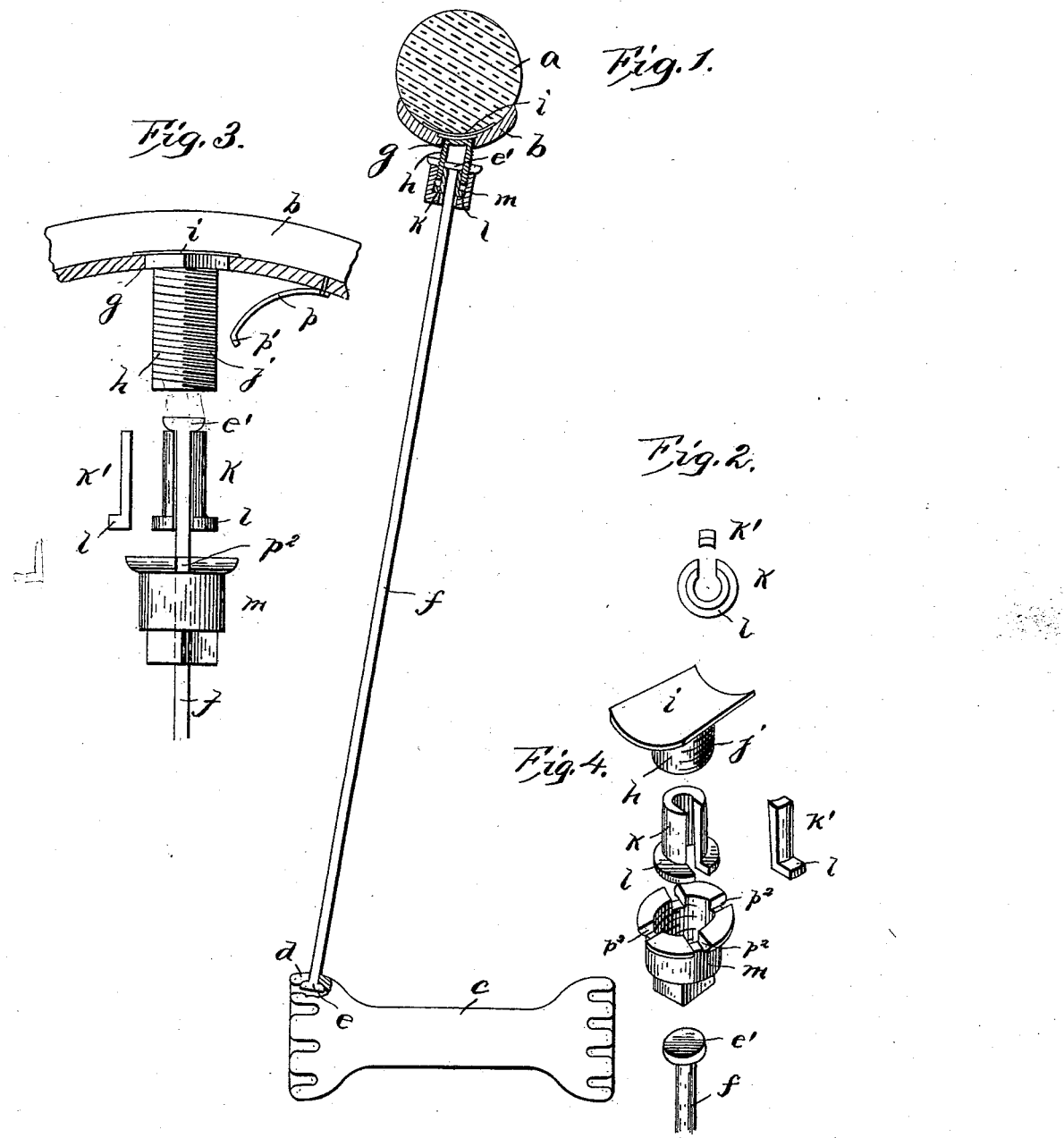
WITNESSES:
E. C. Duffy
Hubert E. Peck.
INVENTOR
Halsey H. Baker
BY C. E. Duffy
ATTORNEY.
THE NORRIS PETERS CO., PHOTO-LITHO., WASHINGTON, D. C.

UNITED STATES PATENT OFFICE.

HALSEY H. BAKER, OF PLAINFIELD, NEW JERSEY, ASSIGNOR OF ONE-HALF TO WILLIAM H. ROGERS, OF SAME PLACE.

SPOKE-FASTENING.

SPECIFICATION forming part of Letters Patent No. 496,844, dated May 9, 1893.

Application filed June 29, 1892. Serial No. 438 352. (No model.)

*To all whom it may concern:*

Be it known that I, HALSEY H. BAKER, of Plainfield, in the county of Union and State of New Jersey, have invented certain new and useful Improvements in Spoke-Fastenings; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in bicycles, and more particularly to an improved spoke and spoke fastening devices.

The object of the invention is to provide improved fastening devices for spokes whereby the spoke can be easily attached or detached for repairs or replacement without disturbing the rubber tire and without requiring the aid of skilled mechanics or special tools, and whereby the spoke can be under great longitudinal strain to firmly hold the rim and yet will be free from all twisting strain and will be so yieldingly held as to prevent excessive rigidity and thereby prevent crystallization of the spokes by transmission thereto of constant jars and vibrations.

A further object of the invention is to provide an improved spoke fastening so constructed and arranged as to prevent cutting or puncturing of the rubber tire by the fastening devices in the metal rim.

A further object of the invention is to provide an improved means so constructed and arranged as to relieve the rim of excessive pressure and thereby strengthen the rim against bending or "buckling."

A further object of the invention is to provide an improved spoke fastening wherein the threaded sleeve holding the spoke is provided with locking means holding it against loosening.

A further object of the invention is to provide an improved spoke which can be easily attached or detached and which can be made complete and sold to the bicycle owners so that they can replace their spokes when injured.

The invention consists in certain novel features of construction and in combinations of parts more fully described hereinafter and particularly pointed out in the claims.

Referring to the accompanying drawings:—Figure 1 is a sectional view illustrating a spoke and the fastening means therefor. Fig. 2 is a detail view of the sectional cylinder which fits on the spoke. Fig. 3 is a detail view showing the parts of the fastening separated. Fig. 4 is a view showing the parts of the fastening separated in perspective.

In the drawings the reference letter *a*, indicates the rubber tire.

*b* indicates the rim of the wheel in which the tire fits and is secured as usual.

*c*, indicates the wheel hub provided with the slots *d*, extending inwardly through its edges. Each slot is countersunk at the inner sides of its inner end to receive the head *e* on the inner end of a spoke *f* and hold the same when tightened against slipping out. Each countersink is so formed that the spoke head can freely turn therein when under twisting strain. Each spoke is manufactured with similar end heads *e e'* and without screw threads.

The rim is provided with suitable transverse apertures *g*. Each aperture *g*, receives a spoke socket *h*, at one end secured to the inner face of the rim and having its outer face smooth and formed to fit the rubber tire. Each socket is so fitted in the aperture in the rim as to prevent turning of the socket. This can be accomplished in any desirable way, as by a square or angular boss on the inner face of said plate fitted in a corresponding depression in the rim as shown in Fig. 1 or by forming the portion of the spoke socket which passes through the rim angular or square to fit a correspondingly shaped aperture in the rim as shown in Fig. 3. Each socket is inserted through the rim from the inside and loosely fitted therein and the portion of the socket exterior of the rim is exteriorly threaded at *j*. The bore or interior of the socket is smooth and of such a size as to receive either head of a spoke. Before a spoke head is inserted in its socket a sectional cylinder *k* having the exterior shoulder *l*, is placed on the end of the spoke with the shouldered end of the cylinder extending toward the hub. This cylinder is of such size as to fit the spoke socket but so that it cannot slip over the head of the spoke. An internally threaded sleeve $m$, is then slipped over the opposite end of the spoke and screwed onto the exterior of the spoke socket. This sleeve has an internal annular shoulder $n$, at its outer end which engages the exterior shoulder $l$ of the cylinder $k$ and as the sleeve $m$ is screwed onto the socket the shoulders $l$, $n$, engage and the upper end of the cylinder engages the head of the spoke and thereby draws the spoke to the desired degree of longitudinal tightness and tightens the wheel.

The bore of the cylinder $k$ is slightly tapered inwardly toward the hub so that there will be no undue clamping of the spoke and so that free vibration of the spoke is permitted thereby preventing crystallization which takes place when portions of the spokes are tightly clamped. It should be noted that the spoke is at no point tightly clamped but is free to vibrate throughout its entire length. The only strain on each spoke is a drawing or longitudinal strain applied at the heads of the spoke.

The plates in the rim attached to the fastening brace and stiffen the rim, and furthermore prevent all damage to and cutting of the rubber tire by the fastening. The spoke fastenings heretofore usually employed soon wear loose and project through the rim against the tire and because of the constant jar and vibration cut and damage the tire. This spoke fastening can vibrate through the rim in a direction parallel with the length of the spoke and as the plate $i$ on the end of the fastening rests against the tire excessive pressure or strain on the tire is transmitted directly to the spokes, thereby relieving the rim to a certain extent. The rim can hence be made somewhat lighter in construction and is prevented from "buckling" or bending as the excessive jars and strains are transmitted directly to the spokes. Furthermore by reason of this peculiar fastening the spokes can be tightened to a greater degree of tension than where threaded spokes are employed and the spokes are less liable to break or become loose. The spokes can be easily and quickly tightened when necessary by a simple wrench, and can be easily removed by unscrewing the threaded sleeve $m$, and drawing the spoke head and cylinder from the socket and separating the cylinder and slipping it laterally from the spoke, and removing the spoke from the hub. Another spoke can be quickly substituted as the heads of the spokes are similar and the spokes are interchangeable and no care need be taken as to which way the spoke is inserted.

The cylinder $k$, is open on one side so that it can be slipped laterally off or onto the spoke, and a small section $k'$ is employed to close the slot or opening so that the cylinder when in the socket will completely surround the spoke.

Suitable means can be employed to lock the threaded sleeve against loosening after it has been screwed up to tighten the spoke. The means here shown for accomplishing this purpose consists of a spring $p$, at one end secured to the inner face of the rim so that the projection $p'$ (Fig. 3) will bear against the upper edge of the threaded sleeve and enter notches $p^2$ therein and thus hold the sleeve. This spring can be held up when it is desired to unscrew the sleeve.

It is evident that various changes might be made in the forms, constructions and arrangements of the parts described without departing from the spirit and scope of my invention. Hence I do not wish to limit myself to the construction here set forth but consider myself entitled to all such constructions and changes as fall within the spirit and scope of my invention.

What I claim as new, and desire to secure by Letters Patent, is—

1. In combination, a rim having apertures, spokes, spoke sockets loosely extending through said apertures, and each having a plate on its inner end loosely located in the rim and bearing against the rubber tire, substantially as described.

2. The combination of a hub, a spoke having end heads one of which engages the hub, a rim, a spoke socket loosely carried by the rim and exteriorly threaded, the opposite spoke head loosely fitted in said socket, a cylinder loose on said spoke engaging said head, so as to exert longitudinal strain only on the spoke and the threaded sleeve on said socket having a shoulder engaging said cylinder and exerting longitudinal strain only on said cylinder, substantially as described.

3. The combination of the hub, a spoke having the end heads, one head held in a slot in the hub, the rim having an externally threaded spoke socket, the spoke end loose in said socket, the cylinder on said spoke bearing against the head thereof and having the shoulder at its outer end, and the threaded sleeve on said socket having the shoulder engaging the shoulder of the cylinder and by which the longitudinal strain is exerted on the spoke, substantially as described.

4. In combination, the headed spoke, the spoke socket externally threaded, the separable cylinder on the spoke end in the socket having the internal taper and external shoulder, and the threaded sleeve on said socket having the internal shoulder engaging said cylinder shoulder, substantially as described.

5. In a spoke fastening, the combination, the spoke, the spoke socket, the threaded sleeve exerting longitudinal strain on the spoke and having edge notches, and the locking device engaging said notches of the sleeve and carried by said rim, substantially as described.

6. A wheel having the series of separate plates one for each spoke against which the rubber tire bears and located in the rim so as to move independently thereof toward or from the wheel center, and the spokes confined to their respective plates separate from the rim and arranged to receive on their outer ends the thrusts of said plates substantially as described.

7. A wheel having its spoke fastenings passing loosely through the rim so as to allow independent movement between the rim and spokes and provided with separate plates independently movable within the rim bearing against the rubber tire, substantially as described.

8. In a bicycle wheel, the combination of the rim having the apertures, the rubber tire, the spokes confined to the hub, the spoke sockets extending loosely through said apertures and each provided with a plate on its inner end loose in the rim and bearing against the tire, the spoke ends loose in the sockets, the sockets externally threaded, and the nipples screwed on said sockets and exerting longitudinal strain on the spokes, substantially as described.

In testimony that I claim the foregoing as my own I affix my signature in presence of two witnesses.

HALSEY H. BAKER.

Witnesses:
H. O. NEWMAN,
ALBERT RUNYON.